United States Patent [19]

Somos et al.

[11] 4,316,450
[45] Feb. 23, 1982

[54] PROCESS AND APPARATUS FOR THE UTILIZATION OF SOLAR AND GEOTHERMAL ENERGY IN DOUBLE WALL STRUCTURES

[75] Inventors: András Somos; István Turi; Ferenc Zatykó; János Gyurós; Laszló Borsody, all of Budapest, Hungary

[73] Assignee: Kerteszeti Egyetem, Budapest, Hungary

[21] Appl. No.: 187,572

[22] Filed: Sep. 15, 1980

Related U.S. Application Data

[63] Continuation of Ser. No. 971,937, Dec. 21, 1978, abandoned.

[51] Int. Cl.³ .................................................. F24J 3/02
[52] U.S. Cl. .................................... 126/432; 126/444; 126/450; 165/45

[58] Field of Search ............... 126/444, 450, 419, 422, 126/432, 426, 431, 430, 436, 437; 165/45; 52/2, 1, 173 R

[56] References Cited

U.S. PATENT DOCUMENTS

| | | | |
|---|---|---|---|
| 3,965,972 | 6/1976 | Petersen | 126/435 |
| 4,000,850 | 1/1977 | Diggs | 126/431 |
| 4,003,365 | 1/1977 | Wiegand et al. | 126/437 |
| 4,004,380 | 1/1977 | Kwake | 126/416 |
| 4,018,213 | 4/1977 | Mann | 126/431 |
| 4,054,246 | 10/1977 | Johnson | 126/431 |
| 4,108,373 | 8/1978 | Chiapale et al. | 126/431 |

*Primary Examiner*—Daniel J. O'Connor
*Attorney, Agent, or Firm*—Gabriel P. Katona

[57] ABSTRACT

Solar and geothermal energy are utilized in structures having a double-walled foil covering which is transparent to solar radiation by spraying ground (well) water at preferably superatmospheric pressure into the space between the two foil covers.

2 Claims, 2 Drawing Figures

PROCESS AND APPARATUS FOR THE UTILIZATION OF SOLAR AND GEOTHERMAL ENERGY IN DOUBLE WALL STRUCTURES

FIELD OF THE INVENTION

The invention concerns a process for the utilization of solar and geothermal energy in structures with double walls, covering or cladding, and an apparatus for the performance of the process.

DESCRIPTION OF THE PRIOR ART

The use of foil-clad greenhouses heated by external sources of energy, e.g. by thermogenerators, is increasingly widespread in agriculture when a low ambient temperature and insufficient sunlight justifies such an application. Foil clad structures heated by thermogenerators allow the early planting of certain plants, but the high investment and operating costs involved make economic operation doubtful in many cases, or cause the price of plants produced this way to be rather high. For instance, considering a heating installation of 15-t capacity, the operating costs of heating by thermogenerator over a season (crop cycle) amount to 30-40 Forints (Hungarian currency) per sq.m. It is a characterstic of investment costs that for every hectare of production area 10 thermogenerators are required.

According to a known method for improving the heat insulation of structures with a double covering, water is caused to flow through the space between the skins of the double covering. Special water run tracks and baffle plates are used to maximize the foil area that is covered by the water. Such experiments have also been carried out with greenhouses. It is also a known concept to let water flow between a double foil layer. However this method has considerable drawbacks; such as the need to use baffles etc. which makes a practical application of this method virtually impossible. In addition, the flowing water cannot provide the required heat efficiency.

SUMMARY OF THE INVENTION

An object of this invention is to eliminate the aforementioned drawbacks of known foil covered structures and to provide a process and an apparatus whereby the inherent heat of the ground (soil) is utilized for heating structures with double walls, covering or cladding.

The invention is based on the discovery that the above object can be achieved if the water is obtained from the ground and sprayed at a given temperature into the space between the double foil.

According to one aspect of the invention, therefore, there is provided a process for the utilization of solar and geothermal energy in structures having double walls, covering or cladding wherein water is passed into the space between two layers, skins or foils of the structure when erected on the ground. The invention provides a method wherein the water is pumped or otherwise obtained from the ground and transferred at a given temperature by spraying to the inner foil, layer or skin at a super-atmospheric pressure, creating a humid atmosphere in the space between the foil, layer or skin by the spray effect. The water then is collected at the bottom of the space between the two foils, layers or skins and recirculated into the ground.

The quantity of the water to be sprayed has to be controlled so it can be varied, in a manner depending on the ambient temperature.

Apparatus for the performance of the process is provided wherein closed ducting and spraying elements are used to feed water into the space between the two foils, layers or skins and the water which collects is channelled into a device for returning the water into the ground which device is preferably a drying basin.

Experiments have shown that the investment and the operation of the structure according to the invention are very economical. Thus, for every hectare of productive area six wells, each with a capacity of 5 hectoliters, and six pumps are sufficient.

In this invention, 15 to 35 hectoliters of water per hectare per minute are required. In such a case, frost-free conditions will prevail inside the structure at ambient temperatures of $-10°$ C. to $-25°$ C., assuming the temperature of the water to be $13°$ C. which cools down to $2°$ C. to $3°$ C. in the space between the two foils.

In the structure or plant according to the invention, the inherent ground heat, the "cave effect" of the ground heat, as well as the thermal energy of the water and solar radiation can all be utilized with the aid of the water sprayed in. The utilization of the heat energy of the water and the heat energy of the ground transferred to the water does not require any external energy source apart from the one for operating the pump.

BRIEF DESCRIPTION OF THE DRAWING

The invention is described by reference to an exemplary embodiment illustrated in the accompanying drawings, wherein.

DESCRIPTION OF THE PREFERRED EMBODIMENT

Figure 1:
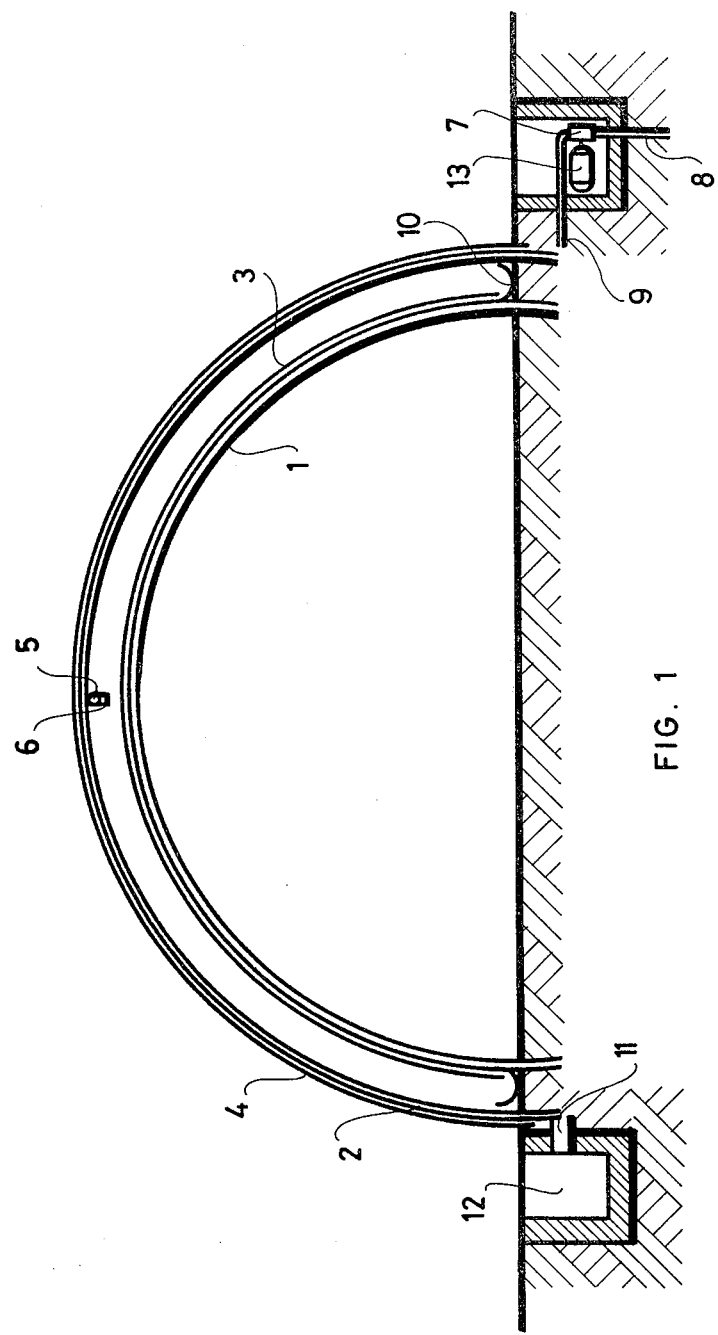
FIGS. 1 and 2 show schematic vertical cross-sections of a structure with a double wall, each of which is a foil according to the invention.

According to FIG. 1 it consists of an inner tubular frame 1 and an outer tubular frame 2, both anchored to the ground. The inner frame 1 is covered by an inner foil cladding 3 and the outer frame 2 is covered by an outer foil cladding 4. The outer foil cladding 4 is fastened at the bottom by compacted soil heaped on it and the inner foil cladding 3 is fastened by a water-collecting channel 10 secured to the inner frame 1. A pipe line 5 runs through the whole length at the top of a space formed by the two foil claddings, 3 and 4, along the ridge line. In the pipe line 5 are spraying elements which can be, for example spray heads 6 arranged at a suitable spacing from one another along the pipe line 5. The pipe line 5 is connected by a vertical pipe and a collector pipe, not shown in the drawings, to one or more tubular pumping well(s) or to the delivery side of a pump 7 connected to the pumping well(s) which pump water from the ground. The pipelines 9 are connected to the delivery side(s) of the pump(s) 7.

The pump(s) 7 are driven by drive motor(s) which are included in a control circuitry of a temperature-sensor measuring the ambient temperature of the structure in such a way that when the ambient temperature falls, increasing numbers of pumps are switched on so that increasing amounts of water are pumped into the pipe line 5 and the spray nozzles 6 for spraying. The water running down the inner foil cladding 3 in the form of a water curtain within the enclosed air space is collected by the collector channel 10 whence the water is transferred by a collector pipe, not shown in the drawings, and via a pipe line 11 into a drying basin 12. It is understood that depending on the relative absorbing capacities, more than one drying basis may be required for a particular plant or installation.

As will be understood so far, only the operation of the pump(s) 7 requires an energy input in order to feed water from a selected layer in the ground into the space formed between the two foil covers 3 and 4. In this way, the heat stored in the ground can be utilized through the water lifted from below the ground surface, and a "cave effect" is generated on the surface of the ground covered by the structure. The double foilcladding and the water curtain provide excellent heat insulation in relation to the ambient atmosphere and at the same time, the insulation is permeable to solar radiation, thus rendering the utilization of solar energy possible.

Figure 2:
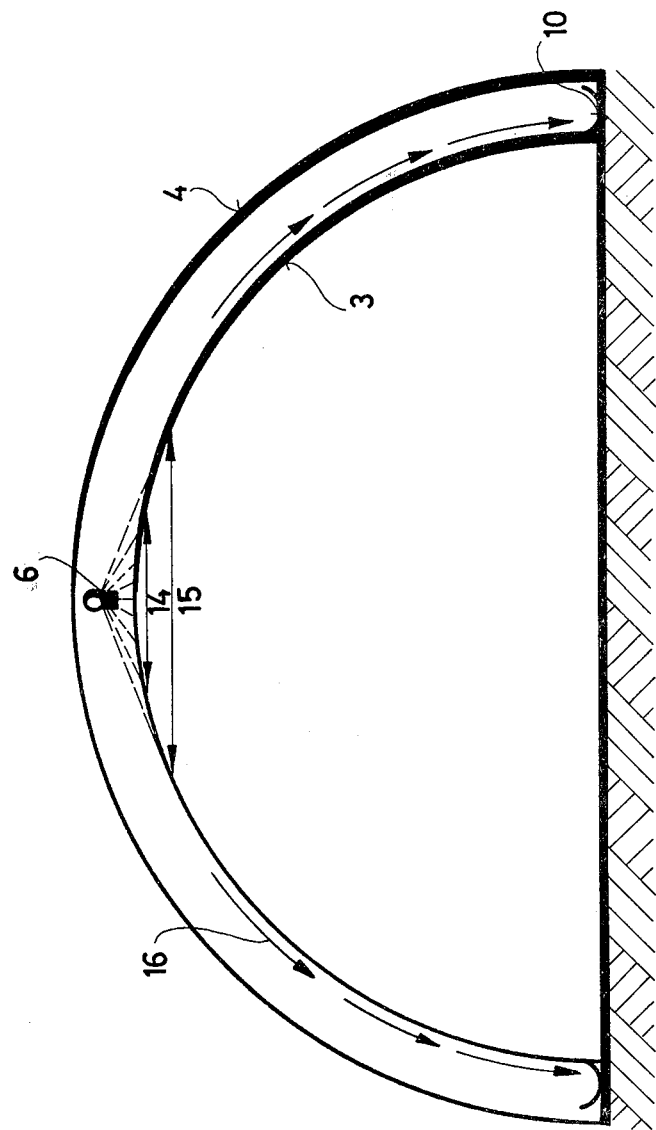

FIG. 2 is a simplified schematic of FIG. 1 to show that as water is sprayed from the spray heads 6 and as it runs down in the direction of the arrows 16, it will cover increasing annular areas 14 and 15.

The process and the apparatus according to the invention have been applied mainly in the form of a foil tent, which can also be used in such structures for the purpose of keeping livestock and the like in which case pumps are not necessary.

Depending on the relation between the utilized water and the ambient temperature the process and the apparatus according to the invention can alternatively be applied for heating or cooling.

What we claim is:

1. A process for using geothermal energy as a source of heat and solar energy as an additional source of heat to control the temperature of the area enclosed by a double wall structure standing on the ground wherein the double wall structure comprises an inner wall and an outer wall defining an enclosed air space, said inner and outer walls which are each a solar transparent foil extend from front to back of the structure, which process comprises the steps of pumping at super-atmospheric pressure, water from at least one source of naturally heated naturally occurring water into a spray means in said enclosed air space at the inner surface of the outer foil wall and spraying said water onto the enclosed top surface of the inner foil wall creating a flowing curtain of water which flows downward on the enclosed top surface of the inner foil wall, thereby transferring heat from the water to the area enclosed by the double wall structure, said water curtain being a heat insulator which is permeable to solar radiation allowing any sunlight present to contribute heat to the said enclosed area, and then collecting run-off water at the bottom of said enclosed space between the walls and conducting it to a ground location remote from the naturally occurring water source and allowing it to seep into the ground.

2. An apparatus for using geothermal energy as a source of heat and solar energy as an additional source of heat to control the temperature of the area enclosed by a double wall structure standing on the ground, said structure comprising an inner wall and an outer wall defining an air enclosed space, said inner and outer walls each being a solar transparent foil from front to back of the structure, a water spray means attached to the inner top surface of the outer foil wall facing the outer top surface of the inner foil wall to spray water onto the outer top surface of the inner foil wall, a pipe connected to said spray means and a pumping means, which pumping means is adapted to pump naturally occurring water through said pipe to said spray means; a water collecting means at the bottom of said enclosed air space to collect runoff water and means to carry the runoff water to a location remote from the source of the naturally occurring water to enable the runoff water to seep into the ground; wherein said spray means is directed so the water forms a curtain whereby heat from the water is transferred to the enclosed area and solar energy is permitted to enter the enclosed area, thus controlling its temperature.

* * * * *